July 3, 1951          H. J. YOUNG          2,559,491
NONVIBRATING HUB FOR WHEELS
Filed April 4, 1947
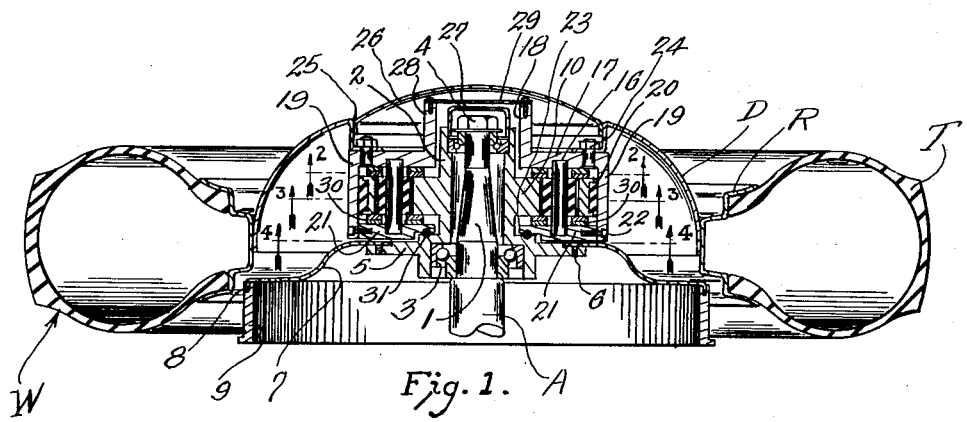
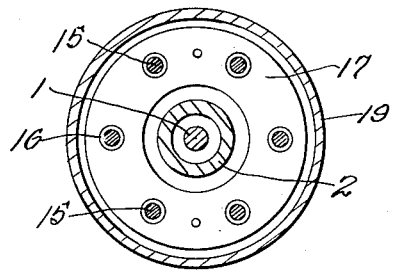
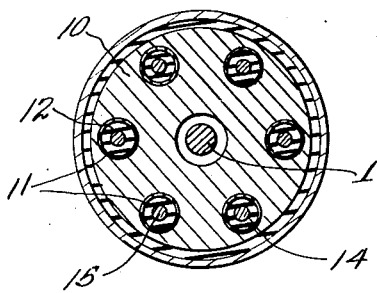
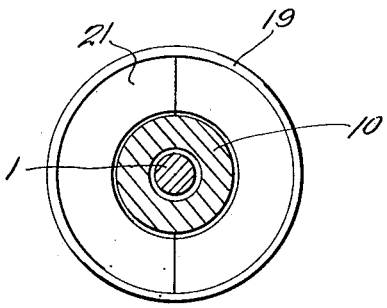
INVENTOR
Herbert J. Young
BY Wilfred E. Lawson
ATTORNEY Patented July 3, 1951

2,559,491

UNITED STATES PATENT OFFICE 2,559,491

NONVIBRATING HUB FOR WHEELS

Herbert J. Young, Wichita, Kans.

Application April 4, 1947, Serial No. 739,277

2 Claims. (Cl. 152—43)

This invention relates to a wheel structure and has relation more particularly to the hub of the wheel and it is primarily an object of the invention to provide a hub which enables the associated wheel to be used with equal facility in connection with vehicles for pleasure, commercial or industrial use.

It is also an object of the invention to provide a wheel hub constructed and assembled in a manner wherein is substantially eliminated liability of fatigue failure of the axle to which it is applied and which also serves to effectively absorb shock or sudden strain incident to travel.

Another object of the invention is to provide a wheel hub which operates to eliminate a certain percentage of vibration of the car body and which is of great assistance in torque.

A still further object of the invention is to provide a hub for a wheel which will serve to prevent spinning of the wheels for a quick get-away and which when the vehicle is stopping at a curb or the like will materially relieve shock on the wheel.

A still further object of the invention is to provide a hub structure for a wheel which will reduce liability of skid on quick starting or stopping.

The invention consists in the details of construction and in the combination and arrangement of the several parts of my improved wheel structure whereby certain advantages are attained, as will be hereinafter more fully set forth.

In order that my invention may be better understood, I will now proceed to describe the same with reference to the accompanying drawing, wherein:

Figure 1 is a sectional view taken radially through a hub structure constructed in accordance with an embodiment of the invention, certain parts being in elevation;

Figure 2 is a sectional view taken substantially on the line 2—2 of Figure 1;

Figure 3 is a sectional view taken substantially on the line 3—3 of Figure 1; and Figure 4 is a sectional view taken substantially on the line 4—4 of Figure 1.

As disclosed in the accompanying drawing, A denotes an axle of a vehicle and which vehicle may be for pleasure, commercial or industrial purposes. Associated with the axle A is the spindle 1 upon which the wheel W is mounted.

In the present embodiment of the invention, the wheel W comprises a hub which includes a cylindrical sleeve or body member 2 of desired dimensions and which is placed in surrounding relation with respect to the spindle 1 and held in desired position thereon by the conventional bearing assembly 3 and, of course, the conventional holding or retaining nut 4 operatively engaged with the outer extremity of the spindle 1.

The rear portion of the body or sleeve 2 has formed therewith a surrounding continuous flange 5 at right angles to the axis of the body or sleeve 2 and which flange 5 is suitably anchored as at 6 to a disc 7 having its periphery operatively engaged as at 8 with the brake flange 9. When desired, this brake flange 9, together with the disc 7, may be omitted.

At substantially its longitudinal center the body or sleeve 2 has formed therewith a continuous surrounding and relatively heavy disc 10 provided through its peripheral portion at spaced points therealong with the openings 11, in each of which is housed a sleeve 12 of rubber compound or other resilient material suited for the purposes desired. Each of the sleeves 12 has disposed entirely therethrough an axial bore 14 through which is snugly engaged a rigid pin 15 of metal or such other material as may be preferred. Each pin 15 is of a length to extend a material distance beyond the opposite ends of its associated sleeve 12 and one extended portion of the pin 15 is snugly received within a pocket 16 provided in the inner face of an annular plate 17 surrounding the body or sleeve 2 outwardly of the disc 10. The central opening 18 of this annular plate 17 is of a diameter in excess of the major diameter of the adjacent portion of the body or sleeve 2 so that the plate 17 may have universal movement within certain limitations with respect to the body or sleeve 2.

The peripheral portion of the plate 17 is defined by an inwardly disposed flange or rim 19 of a length to bridge or extend over the disc 10 and is spaced from the periphery of such disc 10 by an interposed cushion band 20 of predetermined thickness and which band is of a rubber compound or other material having desired resiliency.

The flange or rim 19 is disposed a material distance inwardly of the disc 10 to allow the snug fitting therein of an inner annular plate 21 removably and securely held in place by the threaded elements 22 disposed through the inner portion of the rim or flange 19 and engaging within the peripheral portion of the plate 21. The central opening 23 of this inner plate 21 is also of such a radius in excess of the adjacent or inner portion of the body or sleeve 2 to permit desired universal movement between the plate 21 with respect to the adjacent or inner end portion of the body or sleeve 2.

Suitably secured as at 24 to the outer face of the plate 17 at its peripheral portion is the inner margin of an annular wheel disc D of desired dimensions and which is formed at its central portion with a socket 25 to receive a hub cap 26. The outer marginal portion of the disc D carries a conventional type of rim R with which is operatively engaged the tire T.

The outer end portion of the body or sleeve 2 has operatively engaged therewith a supplemental cap 27 and the central opening 18 of the plate 17 is defined by an outstanding sleeve 28 of a length terminating beyond the applied cap 27 and the outer end of this sleeve 28 is closed by a cap plate 29.

While the hub as herein disclosed is particularly designed for use in connection with a vehicle wheel, yet it is believed to be apparent that it can be employed to equal advantage with clutches of combines, tractors, trucks, generators and pulleys of all kinds. It is further to be stated that it can be used to advantage in connection with ship propellers where there is undue strain to assist from twisting off the drive shaft.

It is also believed to be obvious from the foregoing that the hub is one which will materially relieve torque tension.

Opposed faces of the disc 10 and the plates 17 and 21 carry the annular discs 30 which constitute contracting friction plates which serve to hold the alignment or camber of the wheel.

It is also of advantage to interpose between the inner portion of the flange 5 and the adjacent portion of the plate 21 a sealing ring 31 of oil resistant rubber or other suitable material.

It is also to be pointed out that the openings 16 are each of a diameter greater than the diameter of the shank 15 disposed therethrough to allow for clearance.

As illustrated in Figure 4 of the drawings, the plate 21 comprises semi-circular sections to facilitate assembly.

From the foregoing description it is thought to be obvious that a wheel structure constructed in accordance with my invention is particularly well adapted for use by reason of the convenience and facility with which it may be assembled and operated.

I claim:

1. A non-vibrating hub structure for the wheels of a motor vehicle and the like, including a spindle, a brake drum, and a tire supporting rim, comprising an inner sleeve having its ends interiorly shouldered for seating on antifriction bearings carried at the inner and outer ends of said spindle, a relatively heavy enlarged annular portion formed intermediate the ends of said sleeve, an annular flange formed at the inner end of said sleeve in spaced relation with respect to said enlarged annular portion, an outer sleeve having an enlarged cylindrical inner end portion spacedly encircling said inner sleeve and the enlarged annular portion thereof, a band of a resilient material snugly interposed between the periphery of said enlarged annular portion and the inner periphery of said enlarged cylindrical portion, a circular plate interposed between said enlarged annular portion and said flange and secured within and to the inner end of said enlarged cylindrical portion, a circular series of coupling pins passing through said enlarged annular portion and having the ends of the same engaged in recesses formed in the inner faces of said plate and the connecting wall at the outer end of said enlarged cylindrical portion, a concavo-convex rim supporting member having a centrally disposed and inwardly directed cylindrical portion provided with an inturned annular flange at its inner end and bolted to the outer wall of said enlarged cylindrical portion, and a concavo-convex cap removably engaged in the cylindrical portion of said rim supporting member.

2. The invention as defined in claim 1, with the said enlarged annular portion provided with a circular series of transverse bores, and lengths of a tubular resilient material snug fitted in said bores and having said coupling pins passing through the centers thereof.

HERBERT J. YOUNG.

REFERENCES CITED

The following references are of record in the file of this patent:

UNITED STATES PATENTS

| Number | Name | Date |
| --- | --- | --- |
| 505,572 | Maxim | Sept. 26, 1893 |
| 1,436,042 | Holschuh | Nov. 21, 1922 |
| 1,444,048 | Walther | Feb. 6, 1923 |
| 1,457,396 | Reuse | June 5, 1923 |
| 2,048,442 | Frank | July 21, 1936 |
| 2,231,037 | Taylor | Feb. 11, 1941 |
| 2,239,077 | Burton | Apr. 22, 1941 |